March 26, 1935. H. C. HAYES 1,995,305

METHOD AND APPARATUS FOR DETERMINING THE FORCE OF GRAVITY

Filed Oct. 10, 1928 2 Sheets-Sheet 1

Inventor
Harvey C. Hayes
By Attorney

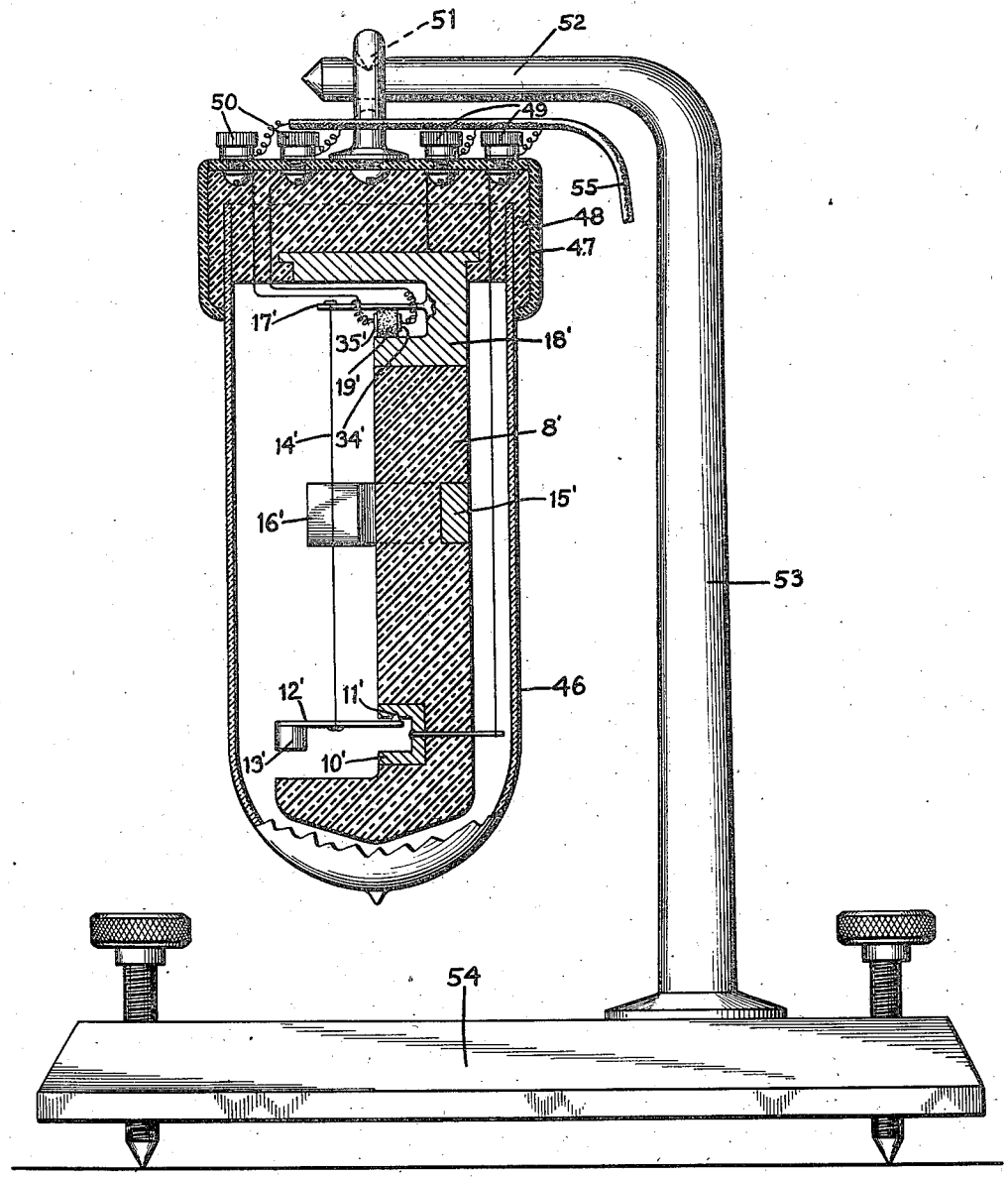

Patented Mar. 26, 1935

1,995,305

UNITED STATES PATENT OFFICE 1,995,305

METHOD AND APPARATUS FOR DETERMINING THE FORCE OF GRAVITY

Harvey C. Hayes, Washington, D. C.

Application October 10, 1928, Serial No. 311,695

6 Claims. (Cl. 177—351)

(Granted under the act of March 3, 1883, as amended April 30, 1928; 370 O. G. 757)

The invention relates to improved methods, as well as suitable apparatus to carry out the methods, for determining the value, or variations in value, of the force of gravity from place to place over the earth's surface. It is well known that this force, herein designated by the symbol $g$, varies over the surface of the earth in accordance with a number of factors, including chiefly differences in latitude and differences in the local structure of the earth, either visible or in the subsurface.

Relatively dense formations which are hidden below the surface of the earth tend to increase the value of $g$ at a particular point, whereas relatively light formations tend to diminish the value of $g$. Knowledge of this fact has been utilized to some extent in the past as a basis for determining or predicting the presence of various types of formation in certain localities. Thus, in territory where the presence of a relatively dense formation may be taken to quite reliably indicate the presence of a definite sort of deposit, various methods have been employed for the purpose of determining the value of $g$ so that these deposits may be located. An example of this type of exploration work is that carried out in certain regions, such as portions of Texas, where it is known that the existence of a salt dome renders the value of the force of gravity somewhat different from what it is in adjacent territory at a greater distance from the dome. These salt domes in turn may be taken as an indication of structure which is suitable for the accumulation of oil.

Various methods have been employed in the past for determining the value of $g$ or its variations, but all of these have been so cumbersome and have required so much time in the taking of readings that the exploration work has been materially handicapped. One such method involves the use of a form of torsion balance which re-acts in a peculiar way in response to changes in density of hidden formations so that these are, in effect, pointed out. These instruments, however, are expensive and cumbersome and at the same time are quite delicate in their adjustments and require considerable precision in handling. Furthermore, for accuracy, it is necessary to operate a torsion balance for such a period of time at each point where it is desired to take readings that relatively few readings may be taken in a day.

Another method, which has been employed to a certain extent, involves the use of an ordinary gravity pendulum whose period of oscillation depends on the force of gravity. The relation between the period of such a pendulum and the force of gravity may be expressed as follows:

$$t = 2\pi \sqrt{k}$$

where $k$ is a constant whose value depends upon the length of the pendulum and other characteristics. The main difficulty in the way of employing this type of pendulum has been the necessity for adopting long periods of operation in order to obtain sufficient accuracy in the results. Attempts have been made to reduce the necessary period of operation to as great an extent as possible by shortening the period of oscillation of the pendulum, which in turn is effected by decreasing the length of the pendulum. It has been found unsatisfactory, however, to attempt to reduce the period of such a device below one-quarter of a second and in order to obtain the desired accuracy in the final result, it has been found necessary to extend a single reading over a period of about twelve hours. One thing which may be pointed out in connection with the two methods mentioned is that the torsion balance deals more with the horizontal forces of attraction, while the gravity pendulum deals with the vertical forces and hence points more directly to the structure sought.

An important object of the present invention has been to devise an oscillatable member whose frequency is affected by the force of gravity, more particularly the vertical force, and one which will oscillate at a considerably higher frequency than the ordinary pendulum. It will be apparent that achievement of this object will enable a considerable reduction in the time required for the taking of readings in order to obtain a certain standard of accuracy. Thus, if the period of the oscillatable member may be reduced, for example, to one thousandth of that of an ordinary pendulum, the time required for a single reading will be correspondingly reduced. This is for the reason that to determine the value of $g$ to a certain degree of accuracy, for example to within an error of one in one million, it is only necessary to observe with relation to a time element a certain definite number of oscillations of a gravity-affected member.

A further object of the invention has been to devise a method of comparing the results obtained from the use of such a gravity-affected device at various points, so that the differences between the force of gravity at such points may be determined. In the accomplishment of this result, furthermore, the invention has in view special means for taking into account the time factor so that great accuracy in timing may be largely eliminated. For this purpose it is contemplated bringing about a direct comparison of the vibrations of the gravity-affected element with those of an element whose vibrations are entirely independent of the force of gravity. This, in accordance with the invention, is accomplished by way of determining the number of beats between the vibrations of the two oscillating elements whose frequencies are preferably near alike. Obviously, the number of beats between the two elements will vary in accordance with variations in gravity, since the frequency of but one element is affected by gravity.

Incidental to the foregoing object, the present invention provides a novel vibratory member having a relatively high frequency and one whose period is not affected by the force of gravity. This member, as well as the gravity-affected member, are preferably adapted to be driven by suitable electrical means, which in turn serve to provide convenient means for effecting the comparison which has been mentioned.

More specifically, the invention contemplates using as the first mentioned member a tensioned wire or string, or similar vibrating element, having a relatively high frequency and one whose period depends upon the tension maintained. The tensioning means may then be in the form of a constant mass whose downward force at any particular point depends upon the value of $g$. An element of this character may readily be made to vibrate with a frequency of as much as between one and ten thousand oscillations per second, which, as compared with the frequency of four vibrations per second of the ordinary pendulum, constitutes a considerable improvement. For the purpose of sustaining the vibration of the element over any period of time desired, it is contemplated employing electrical means in the form of an oscillating current whose frequency is directly controlled by the element itself. Thus, the natural period of vibration of the tensioned string, or other element, is made to determine the frequency of oscillation of the electric current which sustains the vibration of the element. This method of setting up and maintaining the vibratory movement has been found to provide a convenient method of determining the frequency of oscillation of the element by way of determining the frequency of the current which operates the device. This has led to a further feature of the present invention whereby it is contemplated to not only study the fundamental or natural frequency of the element, but to study as well any desired harmonic of this fundamental frequency. Thus, if the element itself has a frequency of ten thousand oscillations per second, the fiftieth harmonic of the electrical current which drives the element might be selected and studied for the purpose of determining the value of $g$, so that in this way the equivalent of a pendulum performing 500,000 oscillations per second might be had. Incidental to the consideration of harmonics of the driving current, it is proposed to so devise the electrical circuit as to give rise to a wide range of harmonics. This is brought about by providing a circuit with distributed capacity or one in which the ratio of inductance to capacity is high.

Now, for the purpose of comparison with the gravity-responsive element, explained above, a somewhat similar element may be employed, as the one which is wholly independent of the force of gravity, and this may likewise be set into oscillation and maintained in this condition by means of a current, which is in turn controlled by the element itself. This second member may assume the form of an elastic rod which may be suspended, or otherwise supported, at its center so that its period of vibration will be wholly independent of the force of gravity. Preferably, the natural periods of vibration of the two elements will be made quite nearly alike so that a relatively small number of beats will occur between their vibrations. If certain harmonics are to be considered instead of the fundamentals, then it is only essential that the frequency of a given harmonic of the driving current for one element should be closely related to some harmonic of the driving current for the second element and it is not essential that the two elements should themselves have substantially similar frequencies. The fiftieth harmonic of one may correspond to the sixtieth harmonic of the other, for example. All that is required is that the number of beats between selected harmonics shall be readily measurable.

Since the frequency of the second element will be constant regardless of changes in gravity, its value, or that of any selected harmonic, may be determined once and for all and may be designated $n$. The frequency $N$ of a selected harmonic of the gravity-affected element will be known to differ from this definite value by the number of beats $b$ per second determined to exist between the two frequencies. By proper selection of the frequencies of the two elements, it may be assured that the gravity-affected element always has a greater value so that the beats will always be added thus: $N=n+b$. Suppose, now, in dealing with a high harmonic of the second element the value of $n$ is in the neighborhood of 500,000 and that the value of $N$ for some harmonic of the gravity-affected element is only greater than $n$ by an amount between 50 and 100, depending upon the force of gravity at various points. The value of $b$ to be measured would then vary only between 50 and 100 per second and this value may very readily be determined with extreme accuracy. In order to determine variations in $g$ of minute value, for example one part in a million, it is necessary that variations in the period $T$ of the gravity-affected element, or its reciprocal $N$, should be determined to a degree of one part in two million. This is due to the relation $$T=2\pi\sqrt{\frac{k}{g}}$$

or $$g=\frac{K}{T^2}=KN^2$$

whence by differentiation $dg=2KNdN$. A variation of one part in two million in the value of $N$ is brought about by a variation in $b$ of ¼ per second where $n$ has the value assumed. It will be apparent as the detailed description progresses that variations in the value of $b$ to this extent may be readily determined with accuracy, particularly when readings are conducted over a period of, say, from one to five minutes.

If the invention is first practiced by setting up the elements at points where the value of $g$ is known, a curve may readily be plotted, adopting the known values of $g$ and the determined values of $b$ as co-ordinates so that in unknown territory $g$ may be determined directly from the curve as against the measured value of $b$.

It will, therefore, be apparent that a comparison, in any suitable way, of the frequencies of the two currents used to drive the two elements will provide the necessary data for the determination of the variations in gravity. If comparison is made of the frequencies of some of the higher harmonics of the currents employed, the value of the period $t$ may be reduced to such an extent that accurate determinations of the value of $g$ may be obtained from readings taken over very brief intervals of time. For example, if the fiftieth harmonic of a fundamental frequency in the neighborhood of 10,000 is selected, as suggested, a reading covering an interval of only a few seconds would result in the same degree of accuracy as is now provided by a reading covering an interval of twelve hours or more when employing an ordinary pendulum.

With the foregoing general outline of the invention in view, it will now be described in greater detail by reference to the accompanying drawings in which one suitable form of apparatus for carrying out the invention is schematically shown. Numerous objects and advantages in addition to those mentioned will become apparent as the detailed description progresses. Of the drawings forming a part hereof,—

Figure 4 is a sectional view in elevation of a modified form of gravity-affected oscillator.

Figure 1:
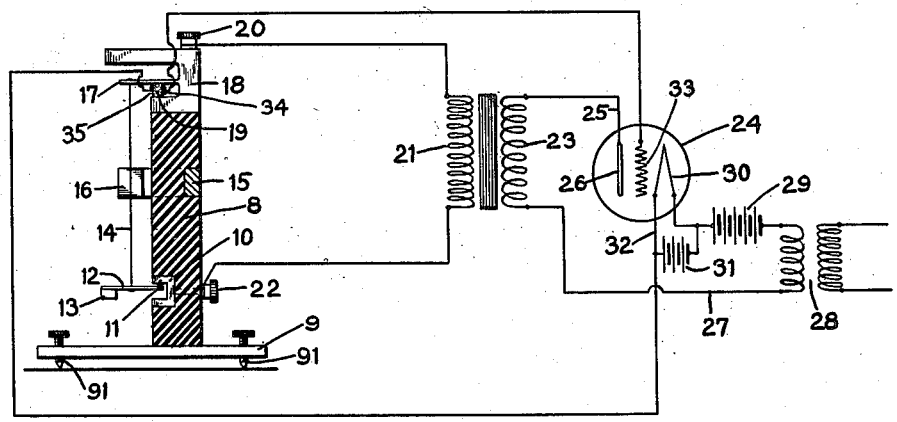
Figure 1 illustrates diagrammatically one suitable form of gravity-responsive oscillator and suitable circuits therefor, certain parts being shown in section.

Referring now to Figure 1, the instrument embodying the gravity-responsive vibratory element may comprise a vertical post or support 8 preferably of electrically insulating material and shown in section in this figure, the support 8 being mounted on a suitable base member 9 which will preferably be provided with a plurality of set-screws 91 for maintaining the base on a true horizontal plane. Toward the lower end of the support there may be inserted in a cutout portion of the latter a block 10 having a channel-like construction, this block being preferably formed of some suitable metal or other good conductor of electricity. In a V-shaped notch formed in the upper horizontal leg of the channel block 10, there is adapted to co-operate with the latter a knife-edge 11 formed at one end of a lever 12. At the opposite end of this lever a mass 13 of any suitable amount may be suspended, while to an intermediate point of the lever there may be attached the lower end of a fine, flexible wire or string 14, which may be similar to the strings employed in galvanometers or oscillographs. This string preferably extends vertically from the lever 12 and passes between the poles of a magnet 15. Only half of the magnet has been illustrated in Figure 1 in order to disclose one of the pole pieces 16. This magnet may either be permanently magnetized or may be an electro-magnet energized from any suitable source. At its upper end, the string 14 may be attached to a finger or arm 17 integral with, or otherwise attached to, a block 18 secured to the upper end of the support 8. The finger 17 should be formed of resilient material and should be of such dimension that it will yield slightly as the element 14 is set into vibration. The block 18, as well as the finger 17, should preferably be formed of metal or a similar good conductor of electricity.

Between the finger 17 and the upper end of the support 8, or an extension of the block 18, there is mounted a piezo-electric crystal 19, this crystal being snugly fitted into the space provided so that vibrations of the finger 17 in response to vibrations of the element 14 will alternately create a pressure and release of pressure on the crystal.

A binding post 20, mounted on the block 18, may be connected to one end of a secondary coil 21 of a transformer. The opposite end of this coil should then be connected to a binding post 22, which is in electrical connection with the block 10. Since the blocks 10 and 18, the lever 12 and the finger 17 are all conductors of electricity, it will be apparent that a circuit is completed through the string 14 and the coil 21. A primary winding 23 of the transformer is in inductive relation to the coil 21 and is placed in the plate circuit of a vacuum tube 24. For this purpose a conductor 25 serves to connect one end of the coil 23 to the plate 26 of the tube, while a conductor 27 serves to connect the opposite end of the coil with an inductance, or the primary coil of a transformer, 28, a source of electricity, such as a battery, 29, and one terminal 30 of the filament of the tube 24. A battery 31, or other source of electricity, may be employed to heat the filament by connection with the terminals 30 and 32 of the latter. The grid 33 of the vacuum tube is connected by a suitable conductor to a plate 34 mounted on one side of the piezo-electric crystal 19. A second plate 35, on the opposite side of the crystal, is then connected by a suitable conductor to one of the terminals of the filament of the vacuum tube.

The operation of the instrument is as follows: The string 14 may be set into mechanical vibration in any suitable way and will vibrate in accordance with its natural frequency. As the string vibrates, the supporting finger 17 will be subjected alternately to a pull and release of the force set up in response to the vibration of the string. This will result in alternate compression and release of pressure on the crystal 19, so that an alternating difference of potential will be generated at the plates 34 and 35 in response to the oscillation of the string 14 and having the same frequency as the latter. The small current thus generated will be passed through the grid circuit of the vacuum tube 24 and will give rise to amplified impulses of the same frequency through the plate circuit of this tube and hence through the primary coil 23 of the transformer. This will induce corresponding effects in the secondary coil 21, which will be transmitted through the binding posts 20 and 22 to the string 14 to maintain the oscillation of the latter. It will be apparent that the electrical impulses generated in the coil 21 will have the same frequency as the current generated by the crystal 19, which in turn has the natural frequency of the string 14. This insures continuous vibration of the string at its natural frequency.

As will be explained hereinafter, the coil of the transformer 28 in the plate circuit of the tube 24 will aid in the determination of the frequency of the string 14, as well as that of the electrical current which drives it. Obviously, the natural frequency of the string 14 will vary with the degree of tension placed upon this string and this will depend upon the value of the force of gravity. The tensioning force acting on the string will be proportional to the force of the mass 13 acting on the lever 12 and this force is represented by the expression $mg$ where $m$ is the quantity of the mass and $g$ is the value of gravity.

Figure 2:
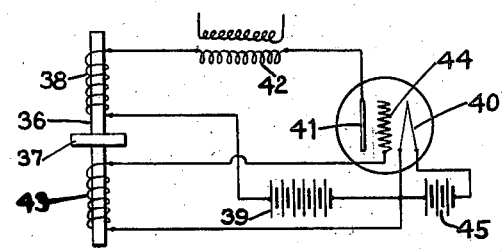
Figure 2 is a similar illustration of a suitable form of oscillator which is independent of the force of gravity.

Referring now to Figure 2, the vibratory element, which is designed to be free from the influence of the force of gravity, may assume the form of a rigid rod or bar 36 which is supported in any suitable way at its midpoint by means of a support 37. The rod 36 may be formed of material having magneto-strictive properties and may have mounted on one end a coil 38 which is connected through a battery or other source of current 39 to the filament 40 of a vacuum tube. The plate 41 of this tube may be connected through an inductance or the primary coil of a transformer 42 to the opposite end of the coil 38. On the opposite end of the rod 36 there may be mounted a coil 43 similar to 38 and having one end connected to the grid 44 of the vacuum tube. The opposite end of the coil 43 may then be connected to one terminal of the filament 40. A battery, or other source of electricity, 45 is connected across the terminals of the filament for heating the latter.

The operation of this device is as follows: A current from the battery 39, flowing through the coil 38 and through the plate circuit of the vacuum tube, will serve to magnetize the rod 36. Magnetization of this rod will bring about a change in length of the latter, in accordance with the law of magneto-striction, and due to the elastic properties of the rod, the elongation will continue beyond the point naturally brought about by the magnetization. The resulting movement of the magnetized rod within the coil 43 will then tend to induce a current in the latter and, by means of the connection shown, this current will be passed through the grid circuit of the vacuum tube. In this way electrical impulses having a frequency corresponding to the natural period of vibration of the rod 36 will be induced in the grid circuit of the tube and an amplified current having a corresponding frequency will be set up in the coil 38 to continue the oscillation of the rod at its own natural frequency. The inductance or coil of the transformer 42 will, of course, carry the same fluctuating current as the coil 38 so that it may be employed in the manner to be described for the purpose of indicating or permitting determination of the natural frequency of the rod. It will be apparent that the period of oscillation of the rod will be entirely independent of the force of gravity.

If desired, the rod 36 may be replaced by an elongated quartz crystal, or other form of piezoelectric crystal, in which case the coils 38 and 43 would be replaced by two pairs of plates or contact coatings mounted on the surface of the crystal. Impulses received from the plate circuit of the vacuum tube would be sent to one of the pairs of plates on opposite sides of the crystal while impulses thus generated in another pair of contacts or plates, due to the elongation and contraction of the crystal, could be sent through the grid circuit of the power-amplifying tube. In this way the crystal may be kept in continuous oscillation at a definite frequency which will be unaffected by gravity or small variations in the operation of the vacuum tube.

It will be found desirable to mount the rod 36, as well as the string 14 of Figure 1, in an evacuated glass tube in order to reduce the damping effect of the air and thus reduce the amount of driving current required to maintain the vibrations of these elements. In addition, the mounting of the elements in such a tube will eliminate the disturbing effects of corrosion and the deposit of drops of moisture from the atmosphere. Furthermore, in order to overcome, as far as possible, the disturbing effect of changes in temperature, the string 14, as well as the rod 36, should be formed of materials which are little affected by such changes, for example invar or elinvar. In addition, as an extra precaution, the glass tubes in which these elements are mounted may be placed in a Dewar flask, or the like, and surrounded by a body of ice to maintain a substantially uniform temperature.

A suitable form which the gravity-affected type of high frequency oscillator may assume when mounted in an evacuated glass tube, as suggested, is shown in Figure 4. All of the parts directly related to the oscillator may be enclosed within a glass tube or casing 46 provided with a base portion 47 preferably formed of bakelite or similar material. Within the base any suitable form of sealing material 48 may be provided to permit the maintenance of a vacuum within the closed casing or tube 46. As shown, the construction may be substantially the same as disclosed in Figure 1, including the main support 8', formed of non-conducting material, together with the block 18', formed of a suitable conductor, both of which may be appropriately suspended within the tube, as by having the block 18' embedded in the sealing material 48. The channel member 10', inserted into a cutout portion of the support, is provided with a V notch into which a knife-edge 11', formed at one end of a lever 12', is adapted to cooperate. A mass 13' at the opposite end of the lever serves to tension a wire or string 14' which passes between the pole pieces 16' of a magnet 15' and is attached at its upper end to the resilient finger 17'. Between this finger and a portion of the block 18' is mounted a piezo-electric crystal 19' having plates 34' and 35' on opposite sides.

An electrical connection may be formed in any suitable way between the channel member 10' and one of a pair of binding posts 49 mounted on the base member 47. The other of this pair of binding posts may be connected to the block 18' at any suitable point. Each of the plates 34' and 35' is connected by suitable conductors to one of a pair of binding posts 50. An upward extension 51 of the base 47 may be provided with an opening, the upper edge of which may be formed as a knife-edge adapted to fit into a V notch in an arm 52 passing through the opening. This arm may be integral with a support 53 carried by a suitable base 54 which may, if desired, be provided with set-screws to enable the maintenance of the support 53 in substantially vertical position. It will not be necessary, however, to provide for accurate adjustment in the positioning of the support 53 since the mounting of the tube comprising the casing 46 and base 47 upon the knife-edge suspension, such as described, will insure the more or less automatic maintenance of the tube in the correct vertical position at all times. Thus, the pull exerted by the mass 13' upon the wire 14' may be made to constantly act in a direct vertical line. For this purpose it will be understood that a proper balance will be established on the tube to insure this vertical alignment when the tube is suspended freely from the arm 52. If desired, the lower end of the glass tube may be immersed in an oil bath for the purpose of damping any vibrations which may be set up in the tube by earth tremors or similar surrounding disturbances.

From the four binding posts 49 and 50, a suitable cable 55 may be employed to connect the parts to the appropriate points in the electrical circuits, such as indicated in Figure 1. Should it be desired to mount the tube within a Dewar flask for the purpose of maintaining a substantially constant temperature through the use of ice, as suggested, the tube might be suspended within such a flask by means of the co-operation of the extension 51 with a hook carried by a stopper or other closure for the flask.

Figure 3:
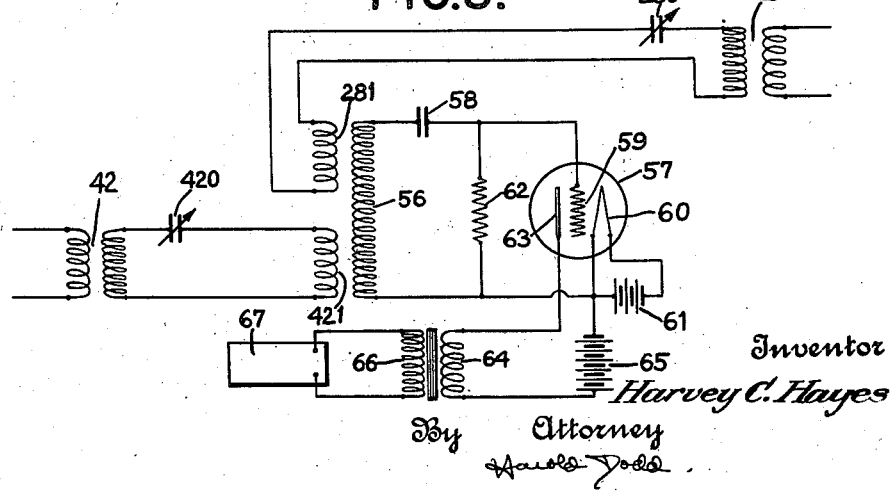
Figure 3 illustrates diagrammatically means for comparing the oscillations of the devices shown in Figures 1 and 2.

In Figure 3 there is shown diagrammatically a suitable arrangement of circuits and devices for bringing about a comparison of the vibrations of the elements 14 or 14' and 36 through a comparison of the currents employed for driving them. As shown, the secondary coil of the transformer 28 may be placed in circuit with a variable condenser 280 and a coil 281. By proper adjustment of the condenser 280, any desired and available frequency may be selected from the coil of the transformer 28 and transmitted to the coil 281. This frequency may either be the fundamental of the driving current or may be any selected harmonic of this fundamental. Similarly, the secondary winding of the transformer 42 may be connected through a variable condenser 420 to a coil 421 so that the latter may receive a current of any frequency which is either the fundamental or any selected harmonic of the driving current for the rod 36.

A coil 56, placed in inductive relation to both of the coils 281 and 421, is adapted to have set up in it electrical impulses having frequencies corresponding to those in the coils 281 and 421. Now, if the coil 56 is appropriately connected in circuit with a suitable detector, such as a vacuum tube 57, the beats occurring between the two frequencies in the coil will be picked out in a manner well known and may be suitably indicated or recorded. For this purpose the coil 56 may be placed in the grid circuit of the vacuum tube, as by connecting one end of the coil through a condenser 58 to the grid 59 of the tube and connecting the opposite end of the coil to the filament 60. A battery, or other source of current, 61 may be employed for heating the filament 60. Preferably, a resistance 62, of suitable value, will be shunted across the grid circuit of the vacuum tube 57.

Now, the plate 63 of the vacuum tube may be connected to one terminal of the primary winding 64 of a transformer, the opposite end of the winding being connected through a battery 65, or other D. C. source of current, to the filament 60 of the tube. A secondary winding 66 of the transformer may then be placed in circuit with an oscillograph, or any suitable form of galvanometer 67, for the purpose of recording or indicating the beats determined by the detector. It will be understood that by the proper design of the transformer 66, the detector may be made to pick out or respond to the difference-frequency or beats between the frequencies carried by the coil 56 rather than the sum-frquency or the independent frequencies themselves.

If a recording oscillograph is employed, it will be apparent that the photographic record may be suitably divided by time-lines at regular intervals of, say, 1/100th of a second. This will enable the determination of the number of beats occurring within a brief interval of time with a considerable degree of accuracy.

It should be understood that regardless of the fundamental frequencies of the driving currents passing through the primary coils of the transformers 28 and 42, any desired harmonics of these may be selected by the proper tuning of the circuits through the secondary coils of these transformers by the use of the condensers 280 and 420 so that the frequencies handled by the coils 281 and 421 may be so selected as to be substantially the same. The oscillatable elements, as well as the electrical circuits, may be so adjusted, for example, that a relatively small number of beats will occur between the two selected harmonic frequencies, say a maximum of one hundred per second. This would result in the indication of only a single beat for approximately each time-line appearing upon the record produced by the oscillograph 67. Obviously, there would be no difficulty in determining with precision the number of beats, or even fractions thereof, with sufficient accuracy under these conditions. It will be clear, furthermore, that if the value of $n$, representing the constant frequency of the 50th harmonic of the driving current for the bar 36, is in the neighborhood of 500,000 per second, whereas $b$, the number of beats, is in the neighborhood of only 100, any slight inaccuracy in the determination of $b$ will have little or no appreciable effect upon the value of $N$ where $N$ equals $n+b$. Thus, an error in the determination of $b$ to the extent of one-half of a beat, which would in fact be inexcusable, would bring about an error in the value of $N$ that would only be one part in one million. With little difficulty, the probable error may be reduced to one part in five million or more, especially where the readings for the determination of $b$ are taken over a period of, say, one to five minutes. In fact a much shorter period should prove sufficient for all normal purposes.

While reference has been made to certain specific forms of apparatus in the foregoing sections, and certain values have been mentioned, it will be understood that these have been included merely for the sake of more clearly illustrating the invention. Many modifications may be made in the practice of the invention which is broad in its scope. Only such limitations as are included in the appended claims should be considered.

The invention described herein may be manufactured and used by or for the Government for governmental purposes without the payment to me of any royalty thereon.

What I claim is:

1. In apparatus of the class described a vibratory string, a mass subject to the force of gravity for varying the tension and the natural frequency of said string, a piezo-electric crystal, means controlled by said string to alternately subject said crystal to pressure and relaxation in accordance with the vibrations of said string, and electrical means controlled by said crystal for driving the string at its natural frequency.

2. In apparatus of the class described a vibratory string, a mass subject to the force of gravity for varying the tension and the natural frequency of said string, a piezo-electric crystal, means controlled by said string to alternately subject said crystal to pressure and relaxation in accordance with the vibrations of said string, and electrical means controlled by said crystal for periodically driving the string at its natural frequency.

3. In apparatus of the class described, a vibratory string, a mass subject to the force of gravity and connected to one end of said string to vary the tension and the natural frequency thereof, a piezo-electric crystal, a connection between the other end of said string and said crystal for alternately subjecting said crystal to pressure and relaxation in response to the vibrations of said string, and electrical means associated with said crystal for driving said string at its natural frequency.

4. In apparatus of the class described, an elongated supporting member, a weighted lever pivotally mounted near one end of said member, an arm attached to the other end of said member, a wire attached at one end to said arm and at the other end to said weighted lever, the arrangement being such that the force of gravity acting upon the lever will place a predetermined tension in the wire, a magnet mounted near the center of said supporting member with its poles at opposite sides and in close proximity to said wire, and a piezoelectric crystal mounted between said arm and said elongated supporting member so that variations in the tension of said wire will cause corresponding compression and relaxation within said crystal.

5. In apparatus of the class described, an elongated supporting member, a lever pivotally mounted near one end of said member, a mass secured to said lever, a flexible arm attached to the other end of said supporting member, a wire attached at one end to said arm and at the other end to said weighted lever, the arrangement being such that the force of gravity acting upon the mass on the lever will tend to place a tension in the wire, a magnet mounted near the center of said supporting member with its poles at opposite sides and in close proximity to said wire, a piezo-electric crystal mounted between said arm and said supporting member so that variations in the tension of said wire transmitted through said arm will cause corresponding compression and relaxation within said crystal, and electrical means connected to said crystal and to that end of said wire to which said lever is attached, said electrical means being responsive to the movements of said crystal for vibrating said wire at its natural frequency.

6. In apparatus of the class described, a vibratory magnetic string, a mass subject to the force of gravity and connected to one end of said string to vary the tension and natural frequency thereof, a piezo-electric crystal, a connection between the other end of said string and said crystal for alternately subjecting said crystal to pressure and relaxation in response to the vibrations of said string, a magnet mounted with its poles on opposite sides of said string, and electrical means associated with said crystal and said magnet for driving said string at its natural frequency, said means comprising an oscillating vacuum tube connected in circuit with said crystal and said string so that changes in pressure in said crystal in response to vibrations of said string cause an oscillating current to be induced in said string to continue the vibration thereof between the poles of said magnet.

HARVEY C. HAYES.